June 21, 1955     D. LURIE ET AL     2,711,338
STICKHOLDERS
Filed Oct. 7, 1953
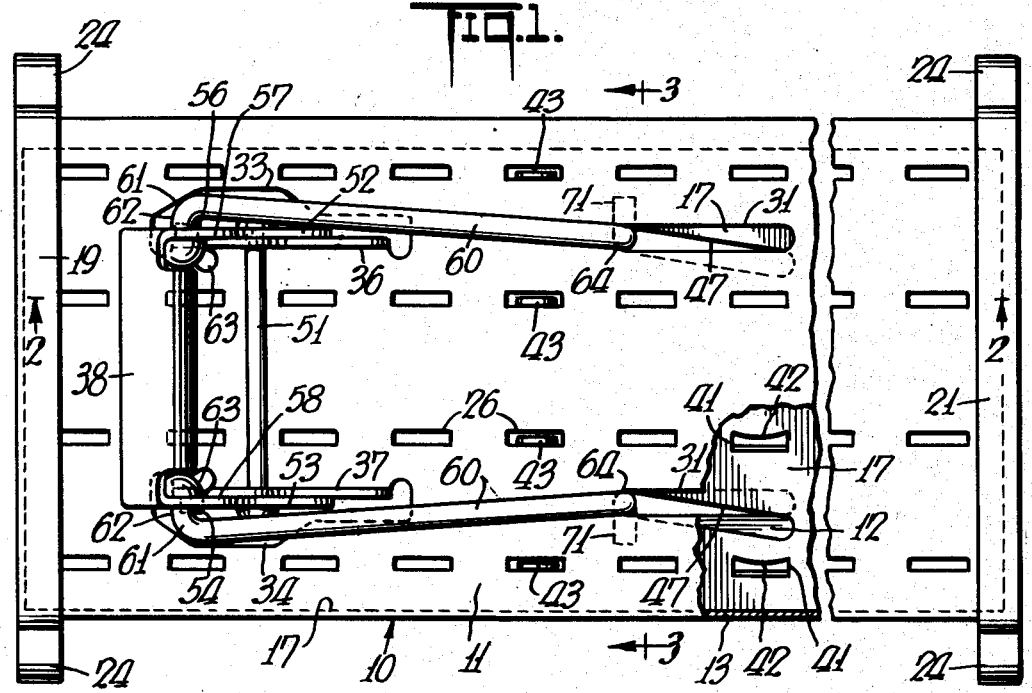
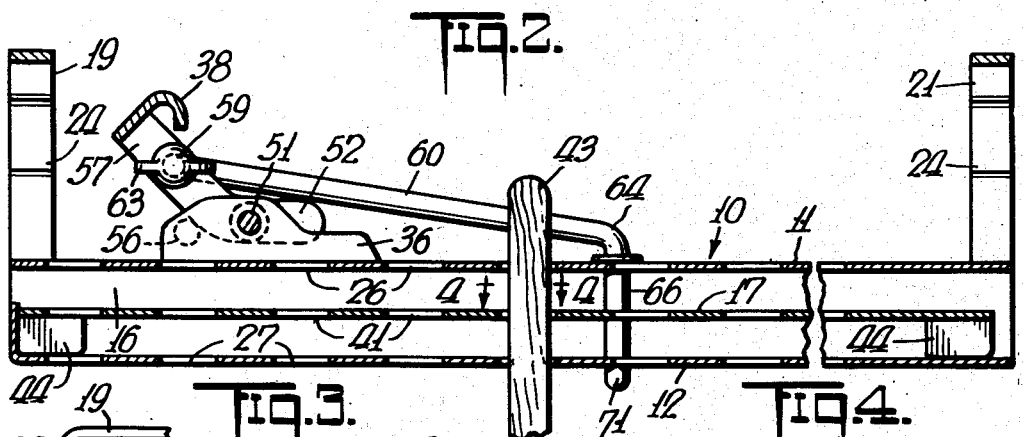
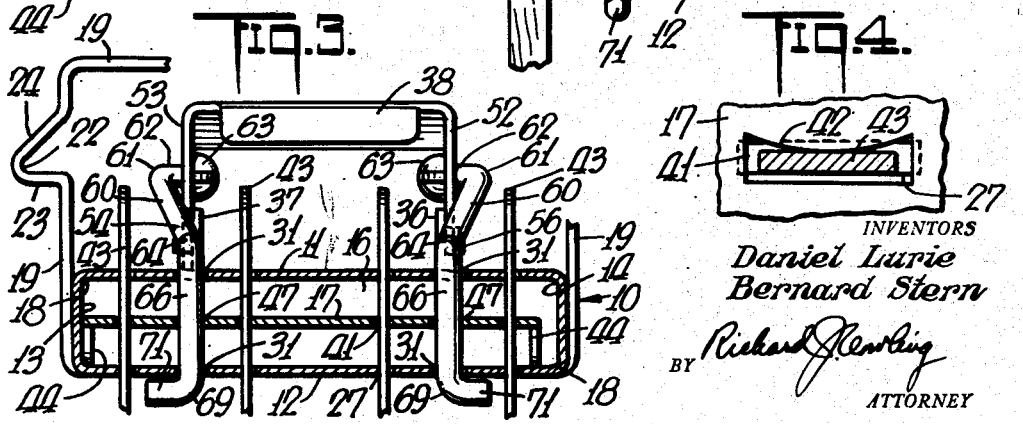
INVENTORS
*Daniel Lurie*
*Bernard Stern*
BY *Richard J. Newling*
ATTORNEY

United States Patent Office 2,711,338
Patented June 21, 1955

2,711,338

STICKHOLDERS

Daniel Lurie and Bernard Stern, New York, N. Y., assignors to Joe Lowe Corporation, New York, N. Y., a corporation of Delaware Application October 7, 1953, Serial No. 384,646

2 Claims. (Cl. 294—87)

The present invention relates to improvements in apparatus commonly known as "stickholders" which are used in the candy and frozen confectionery industries for simultaneously locking, manipulating and releasing a plurality of handle members, such as wooden handle sticks, and it has particular relation to a portable type of stickholder adapted to receive and vertically position a plurality of individual handle sticks in spaced horizontal relation, and manipulate and release said handle sticks simultaneously in a most efficient, sanitary and economical manner.

There are many different kinds of stickholders in common use in these industries capable of performing the particular functions for which the present apparatus has been designed. The latest and most approved types, which consist of upper and lower stationary plates and a shiftable intermediate plate, may be conveniently classified into two categories. The most common type involves a stickholder in which the intermediate plate is shifted longitudinally of the apparatus to lock or release the handle sticks by a manipulating handle that pivots in a longitudinal direction. The second type involves a stickholder in which the intermediate plate is shifted transversely of the apparatus to lock or release the handle sticks by a manipulating handle that pivots in a transverse direction.

With the development of automatism in the frozen confection industry, the closing and opening of such stickholders must be done automatically. As a result, it has been impossible to use both types of stickholder simultaneously in a single system. Therefore, when the automatic installation is made, there are suitable provisions made for mechanism to open and close the stickholders currently being used in the plant. Therefore, most of the automatic installations are provided with means for opening and closing such stickholders in a longitudinal direction corresponding to the line of movement of said stickholders.

With the development of automatism, the length of the refrigerating brine tanks was increased considerably, and it has now been found that stickholders operating with a longitudinal shift of the locking plate become frosted to an extent, especially under very humid climatic conditions, that it is next to impossible for the automatic devices employed for moving said releasing handle to release said handle sticks from their respective stickholders without danger of breaking or damaging the same. Manifestly, when such a condition occurs, the frozen or frost-bonded stickholder must be removed manually from the production line and set aside to warm up until its frost bond has become melted so that its handle sticks and confectionery bodies may be released.

It has been found that stickholders which employ an intermediate locking and releasing plate that is shiftable transversely have much less tendency to freeze up to an extent while passing through a brine tank whereby the automatic devices are incapable of opening or closing its manipulating handle, and that such stickholders give no serious problem due to frost formations in an automatic operation. Consequently, the present invention has been made to provide a stickholder having a transversely shifting intermediate locking and releasing plate that is moved by means of a manipulating handle that operates in a longitudinal direction, whereby it may be used with advantage in automatic operations designed only for opening and closing stickholders having a manipulating handle that pivots longitudinally.

An object of the present invention is the provision of a stickholder that is simple, efficient and sanitary in construction, and which has a manipulating handle movable in one direction that is capable of causing its locking and/or releasing plate member to move in a different direction.

Another object of the invention is to provide a stickholder having a locking and/or releasing handle movable longitudinally for operating a locking and/or releasing plate member that shifts transversely thereof for wedgingly securing releasably a series of horizontally spaced sticks in a vertical position.

A further object of the invention is to provide a stickholder of the character described which comprises a rugged construction employing a few simple parts that may be easily and quickly dis-assembled and re-assembled for cleaning purposes, which is economical to manufacture and simple and efficient to use.

Other and further objects and advantages of the invention reside in the detailed construction of the stickholder, which result in simplicity, economy and efficiency, and which will be apparent from the following description, wherein a preferred embodiment of the invention is shown, reference being had to the accompanying drawings, forming a part hereof, wherein like numerals indicate like parts, in which:

Figure 1 is a fragmentary top plan view of a stickholder, in its open or stick receiving position, embodying the principles of our invention;

Figure 2 is a fragmentary longitudinal sectional view of the stickholder shown in Figure 1, the same having been taken substantially along the line 2—2 thereof, looking in the direction of the arrows;

Figure 3 is a fragmentary transverse sectional view of the stickholder shown in Figure 1, the same having been taken substantially along the line 3—3 thereof, looking in the direction of the arrows; and Figure 4 is a fragmentary view showing the position of a handle stick in one of the series of aligned apertures of the stickholder, the same having been taken along the line 4—4 of Figure 1, looking in the direction of the arrows.

Referring now to the drawings, there is shown in Figure 1 a stickholder 10 consisting of an elongated hollow frame structure of an integral construction, which is generally rectangular in shape, said frame structure consisting of vertically spaced top and bottom plate members 11 and 12, having connecting sidewalls 13 and 14, forming a hollow interior channel 16, which is open at opposite ends and is adapted to receive slidably an intermediate locking and releasing plate member 17 hereinafter to be more fully described. The interior corners 18 of this integral hollow frame structure 10 are rounded, as best shown in Figure 3, to provide interconnecting curved or rounded surfaces to facilitate cleanliness and cleaning.

Fixed handle members 19 and 21 are welded or otherwise secured to the frame structure 10 and extend upwardly of the top plate member 11 adjacent opposite ends to provide suitable means for carrying the stickholder between operations, etc. It will be noted that each side upright of each handle 19 and 21 has an outwardly projecting off-set 22, having a horizontal base member 23 and an upward obliquely extending side member 24. The outwardly projecting off-set 22 provides means for supporting the stickholder 10 on the top edge or rim of a conventional frozen confection mold (not shown) so as to space said stickholder a proper distance above the tops of its open top mold cavities.

The fixed top plate 11 and bottom plate 12 are each provided with a plurality of similarly spaced stick receiving apertures 26 and 27, respectively, arranged in longitudinal and transverse rows. While the arrangement of apertures shown is conventional, it is to be understood that any desirable arrangement may be employed. The apertures 26 and 27 are shown to be of a substantially rectangular shape. The apertures 26 of the top plate 11 are aligned vertically with the apertures 27 of the bottom plate 12. Each plate 11 and 12 has intermediate its ends and between adjacent rows of apertures 26 and 27 a pair of transversely spaced and longitudinally extending parallel slots 31, as best shown in Figure 1.

The top plate member 11 has adjacent one end a pair of enlarged transversely spaced openings 33 and 34, having a shape corresponding to one-half of a hexagon, which are provided along their inner sides with an upturned integral flange 36 and 37 for supporting a manipulating handle 38 hereinafter to be described completely.

The intermediate locking and/or releasing plate 17 is slightly smaller than either the top or bottom plates 11 and 12, and is adapted to be mounted slidably within the hollow interior 16 of the frame structure 10. It is provided with a series of apertures 41 corresponding in size and position to the apertures 26 and 27 of the fixed plates 11 and 12, but has a slightly different shape, in that one longitudinal side of said apertures 41 is convex, as indicated at 42 and as best shown in Figure 4, to provide a limited curved area for engaging a side of a handle stick 43 when the same is positioned therein. The intermediate or locking and releasing plate 17 is provided on opposite sides and adjacent each end with an integral depending projection or leg 44, which serves to space the same substantially mid-way between the top plate 11 and bottom plate 12. The middle plate 17 is also provided with a pair of transversely spaced elongated parallel slots 47, which are so positioned as to be substantially in vertical alignment with the similarly shaped slots 31 in the fixed top and bottom plates 11 and 12, except, however, that the slots 47 extend at an angle oblique to the longitudinal axis of the slots 31 for reasons to be hereinafter explained.

The mechanism for mounting the manipulating handle 38 consists of a pintle 51 mounted pivotally in openings extending transversely through the upstanding flanges 36 and 37. The handle 38 is of a U-shaped construction having angled legs 52 and 53 projecting therefrom to provide suitable bell cranks. Studs 54 and 56 are mounted on the outside end of the flanges 36 and 37 to provide a suitable stop for limiting the pivotal movement of the manipulating handle 38 in either direction. Each handle arm 57 and 58 has an aperture 59 extending transversely therethrough intermediate its ends. Each aperture 59 is adapted to receive a pair of irregularly and identically shaped levers or link members 60. The levers 60 are turned inwardly at right angles adjacent their upper ends, as indicated at 61, to provide lateral inwardly projecting arms 62, which engage, respectively, the handle arms 57 and 58. The outer ends of the arms 62 are threaded and adapted to receive a winged acorn nut 63 for securing the same releasably therein. The levers or link members 60 are also bent downwardly at right angles intermediate their ends, as best shown at 64 in Figure 3, to provide a vertical projecting arm 66 for engaging and passing through the slots 31 of the plates 11 and 12 and the slot 47 of the intermediate plate 17, whereupon said lever arm 60 is again bent or turned outwardly, as indicated at 69, to provide a lateral locking projection 71 for engagement with the lower plate 12. It will be noted that once the upper end 62 of the levers 60 is secured to the manipulating handle 38 by its acorn nut 63, its lower projecting end 71 cannot be moved into a position to disengage the bottom plate 12. To remove the linkage or lever arms 60, it is only necessary to remove the winged acorn nut 63, force the inturned end 62 out of its aperture and then turn said linkage member until the lower outturned end 71 is aligned with the slot 31 in the bottom plate 12, whereupon it may be entirely removed for cleaning purposes. The assembly of the stickholder 10 requires merely a reversal of the aforementioned steps described for its dismantling.

In describing the operation of the stickholder 10, it will be assumed that it is in its open or stick receiving position, as best shown in Figure 1, and that the apertures 31 and 47 are aligned and ready to receive individual handle sticks 43. It will be noted that in this position the manipulating handle 38 is moved to the extreme left, as best shown in Figures 1 and 2. When the handle sticks 43 have been positioned in each set of vertically aligned apertures 31 and 47, the manipulating handle is moved forwardly or to the right in Figure 1, which movement will cause the intermediate plate 13 to be shifted transversely of the main frame structure 10, whereby its left legs 44 will be adjacent the side 13 of said hollow frame structure 10, and the lever arms 66 will be at the right or forward ends of the elongated slots 31 and 47 of the plates 11, 12 and 17, respectively. In this position the convex edge 42 of the apertures 41 of the intermediate plate 17 will engage a side of the handle stick 43 and wedge it against the opposite side of said apertures 26 and 27 of the plates 11 and 12, as best shown in Figure 4.

The loaded stickholder with its handle sticks 43 locked securely therein is now ready to be placed over a mold (not shown) for the freezing of the edible confection bodies thereon. After the mold and stickholder 10 has been passed through a brine tank and the defrosting operation (not shown), the stickholder 10 and its handle sticks 43 and pendant confectionery bodies are placed on a conveyor (not shown) for transmission automatically through a coating operation, if a coating is desired on said confections, and then carried to a bagging table, whereupon it is desired to release said handle sticks 43 from the stickholder 10. As these loaded stickholders 10 move forwardly on the conveyor, the manipulating handle 38 engages an arm or other device which tends to force it rearwardly, thereby pivoting said handle 38 longitudinally of said stickholder 10, which action draws the levers 60 rearwardly, causing the depending arm portions 66 to be drawn rearwardly of the aligned slots 31 and 47. Since the slot 47 in the intermediate plate 17 extends on an angle oblique to the slots 31 in the plates 11 and 12, movement of the arms 66 therealong will cause the intermediate plate 17 to be shifted transversely of the hollow frame structure 10, thereby withdrawing the convex side 42 away from contact with a side of the handle stick 43, permitting them to gravitate freely from said stickholder.

Heavier frost formations seem to form adjacent the rounded corners 18 of the hollow frame structure 10, and such frost formations tend to prevent a longitudinal shifting of the intermediate plate 17 in many instances. It has been found that such frost formations have little tendency to effect a transverse shifting of said intermediate plate under identical circumstances. A large majority of the automatic and semi-automatic installations have been built for opening and/or closing of stickholders with manipulating handles that pivot longitudinally or along an axis corresponding with the longitudinal axis of the conveyor upon which they are traveling. In order to overcome such frost difficulties in these operations, it was necessary either to rebuild the opening and/or closing mechanism of each installation or to develop a stickholder capable of operating in these installations which would cause its locking plate to shift transversely of its frame structure. Previously known stickholders having a transversely shiftable locking plate operated with a handle that pivoted in the same direction, and such stickholders could not be used in these operations because the opening mechanism does not operate in such direction. Therefore, both types of stickholders could not be used interchangeably in any single operating plant.

With the present invention, we have provided a satisfactory stickholder for operating in existing installations and which will have no tendency to become frost-bonded. This stickholder may be used interchangeably on present installations with stickholders that have a manipulating handle pivoting longitudinally for opening and closing, thereby permitting their use without replacement of the present day stickholder until they become worn out or broken beyond repair.

Although we have only shown and described one form which our invention may assume, it will be apparent to those skilled in the art that the invention is not to be so limited, but that various other modifications may be made therein without departing from the spirit thereof or from the scope of the appended claims.

What we claim is:

1. A stickholder comprising a main frame structure having vertically spaced upper and lower plate members, said upper and lower plate members having a series of spaced and aligned openings for receiving handle sticks positioned vertically therein, said upper and lower plate members having a longitudinally extending slot aligned vertically for receiving a shifting lever, a separable intermediate plate member adapted to be mounted slidably between said upper and lower plates having stick receiving apertures alignable vertically with the stick receiving apertures of said upper and lower plates, said intermediate plate having an elongated slot extending obliquely with respect of its longitudinal axis for receiving said shifting lever, and means including a handle having said shifting lever connected thereto and extending longitudinally of the stickholder and passing through the elongated slots of said plate members for causing said intermediate plate to be shifted transversely relative to said main frame structure when said handle is moved in a longitudinal direction.

2. A stickholder comprising a main frame structure having spaced upper and lower plate members provided with a series of spaced vertically aligned and rectangularly shaped apertures for receiving handle sticks, a separable intermediate plate member adapted to be mounted slidably between said upper and lower plate members having elongated apertures substantially rectangular in shape except for one side which is convex for receiving handle sticks, said intermediate plate member being relatively thin and flat except for a series of pendant side legs adapted to space the same intermediate the space between said upper and lower plate members, said intermediate plate having an elongated slot extending obliquely with respect of its longitudinal axis for receiving a shifting lever, and a shifting lever movable longitudinally of said stickholder for shifting said intermediate plate transversely relative to said main frame structure for locking and releasing handle sticks therebetween.

References Cited in the file of this patent

UNITED STATES PATENTS

| | | |
|---|---|---|
| 2,321,632 | Siemund | June 15, 1943 |
| 2,377,364 | Overland | June 5, 1945 |
| 2,461,844 | Overland | Feb. 15, 1949 |